(No Model.)

W. DIEBEL.
BALL BEARING.

No. 582,183.  Patented May 11, 1897.

Witnesses.
Walter Larkin.
George F. Drury.

Inventor.
William Diebel.
by
Frank S. Williams
Attorney.

United States Patent Office.

WILLIAM DIEBEL, OF PHILADELPHIA, PENNSYLVANIA.

BALL-BEARING.

SPECIFICATION forming part of Letters Patent No. 582,183, dated May 11, 1897.

Application filed October 25, 1895. Serial No. 566,834. (No model.)

*To all whom it may concern:*

Be it known that I, WILLIAM DIEBEL, a citizen of the United States, residing at Philadelphia, in the county of Philadelphia and State of Pennsylvania, have invented certain new and useful Improvements in Ball-Bearings; and I do declare the following to be a full, clear, and exact description of the invention, such as will enable others skilled in the art to which it appertains to make and use the same.

My invention relates to new and useful improvements in ball-bearings for use in connection with bicycles and other light vehicles.

The main object of my invention is to reduce the amount of friction in the bearings and decrease the width of tread on the crank-shaft of a bicycle, thereby overcoming a great amount of vibration and strain to which the parts are subjected in the ordinary forms of bearings.

Figure 1:
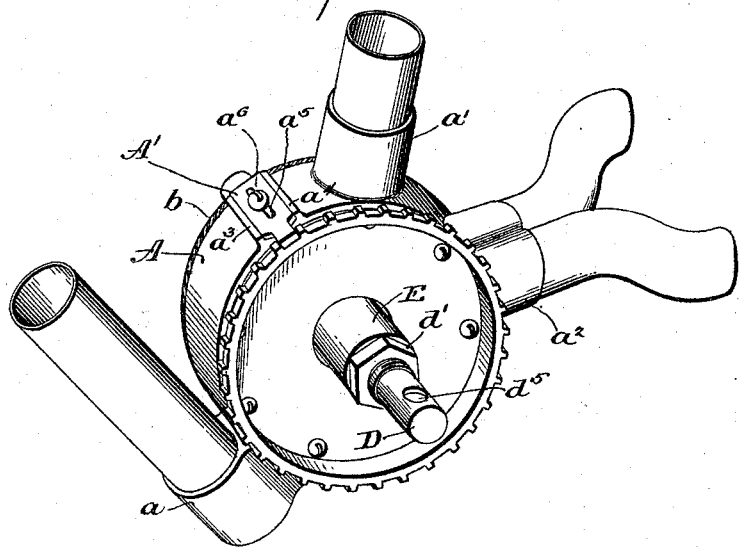
Figure 2:
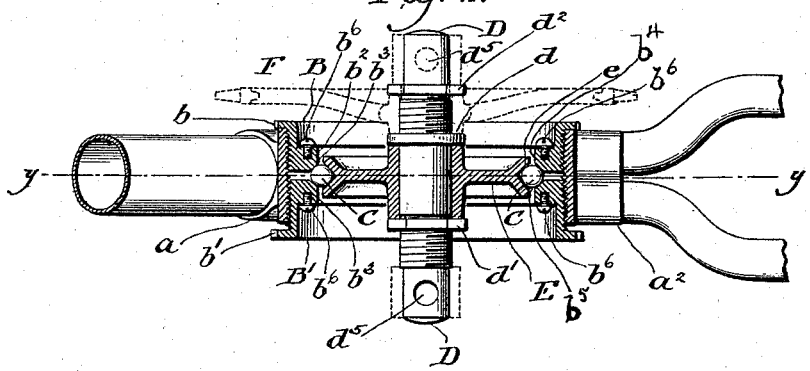
Figure 3:
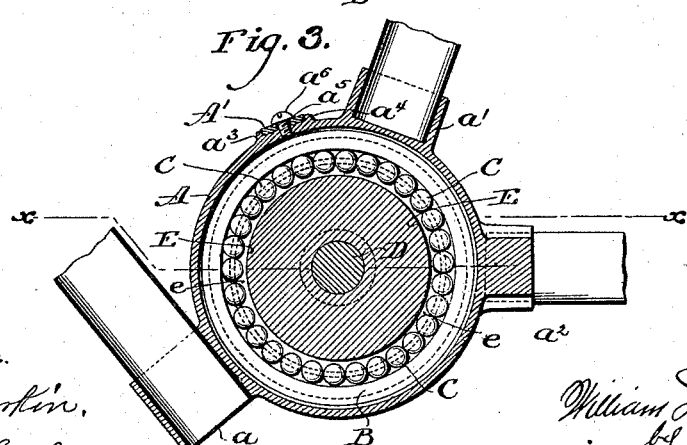

Referring to the accompanying drawings, Figure 1 is a perspective view of a crank-shaft bearing constructed in accordance with my invention. Fig. 2 is a longitudinal section of the same, taken on the line $xx$ of Fig. 3; and Fig. 3 is a section on the line $yy$ of Fig. 2.

Similar letters of reference refer to similar parts throughout the several views of the drawings.

A designates a steel ring having formed therewith projecting portions $a$, $a'$, and $a^2$ for the reception of the tubes forming the framework of the bicycles. The inner surface of the ring A is threaded to receive threaded rings B and B', which are adapted to adjust the bearing. The ring B has a flanged outer edge $b$, knurled for the purpose of turning and adjusting. The ring B' has a corresponding flanged portion $b'$, containing a number of slots for the reception of a plate A', which holds the ring in place after it has been adjusted. This plate is confined between ribs $a^3$ and $a^4$ on the ring A. A slot $a^5$ is formed in said plate for the reception of a screw $a^6$.

On the inside of the rings B and B' are flanges $b^2$ and $b^3$, having inclined edges $b^4$ and $b^5$, between which the balls C are confined.

On the shaft D is mounted a disk E, provided with a V-shaped groove $e$, the sides of which form the opposite bearing-surfaces for the balls C. The disk E may be shrunk upon the shaft D, one side of which is provided with a collar $d$, against which the disk E rests. On the opposite side a nut $d'$ engages the threaded portion of the shaft and rests tightly against the hub of said disk.

The sprocket-wheel F is secured to the shaft D and prevented from turning in either direction by means of a jam-nut $d^2$, mounted upon a left-hand threaded portion of said shaft.

In order to prevent dust or particles of any kind from getting into the bearings, I provide the same with shields in the form of thin steel plates which fit snugly around the hub of the disk E on either side thereof and are secured to the rings B and B' by means of small screws $b^6$.

Having now described my invention, what I claim, and desire to secure by Letters Patent, is—

1. The herein-described bearings comprising a central shaft, a disk of comparatively large diameter mounted thereon midway between its ends, and a casing inclosing said disk and forming a bearing for its periphery, substantially as shown and described.

2. In a bearing for bicycles and other vehicles, in combination, a crank-shaft, a single disk of comparatively large diameter rigidly mounted upon the shaft midway between the ends thereof, the casing or hanger inclosing the disk, and bearings arranged between the casing or hanger and the periphery of said disk, substantially as shown and described.

3. A single bearing for bicycles and other vehicles comprising a disk of comparatively large diameter mounted upon a shaft midway between the end thereof, a groove formed upon the periphery of said disk, an outer ring or casing having a groove formed between the two parts thereof, and a line of balls interposed between said disk and said ring or casing, substantially as specified.

4. The combination in a bearing for bicycles and other vehicles of a ring secured to and forming part of the framework of the vehicle and having an internally-threaded surface, inner rings threaded and engaging said outer rings, flanges upon the outer edges of said inner rings, slots formed upon the flanges of one of said rings, a plate guided upon the outer ring and adapted to engage said slots, a slot formed within said plate, a screw passing through said plate and engaging an opening in the outer ring, a flange formed upon the inner surface of each of said rings and having inclined edges forming outside bearings for a line of balls, a centrally-located disk of comparatively large diameter mounted upon a shaft, a groove formed on the periphery of said disk forming the inner bearing for said line of balls, a collar formed upon said shaft and forming a shoulder for said disk, a nut adapted to a threaded portion of said shaft and adapted to lock said disk in position, a sprocket-wheel adapted to engage a threaded portion of said shaft, a jam-nut for locking said sprocket-wheel, and cranks mounted upon the opposite ends of said shaft for rotating the same, substantially as specified.

In testimony whereof I affix my signature in presence of two witnesses.

WM. DIEBEL.

Witnesses:
 ROBERT W. LLOYD,
 GEORGE F. DRURY.